United States Patent Office 3,271,480
Patented Sept. 6, 1966

3,271,480
BIS-N,N-DIALKYLAMINO PHOSPHORIC ACID ESTERS OF O,O-DIALKYL-α-HYDROXY-β,β,β-TRICHLOROETHYLPHOSPHONATES
Gerhard Schrader, Wuppertal-Cronenberg, Germany, assignor to Farbenfabriken Bayer Aktiengesellschaft, Leverkusen, Germany, a German corporation
No Drawing. Filed Sept. 4, 1963, Ser. No. 306,588
Claims priority, application Germany, Sept. 11, 1962, F 37,781
4 Claims. (Cl. 260—931)

The present invention relates to and has as its objects novel and useful insecticidally active phosphorus containing compounds.

More specifically this invention is concerned with hitherto not yet known bis-N,N-dialkylamino phosphoric acid esters of O,O-dialkyl-α-hydroxy-β,β,β-trichloroethylphosphonates as well as a process for their production.

More particularly the invention relates to compounds corresponding to the general formula

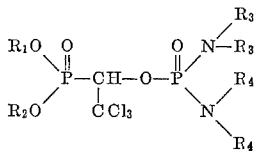

wherein $R_1$ and $R_2$ stand for alkyl radicals with preferably 1 to 4 carbon atoms and $R_3$ and $R_4$ for alkyl radicals with preferably 1 to 2 carbon atoms.

The object of the copending application Serial No. 194,732, filed May 14, 1962, in the name of Gerhard Schrader and Walter Lorenz, and now U.S. Patent No. 3,211,772, are α-dialkyl-phosphonyl-β,β,β-trichloroethyl-(thiono)-phosphonic (-phosphinic) acid esters of the general formula

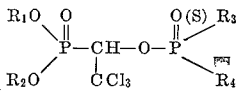

in which $R_1$ and $R_2$ stand for lower alkyl radicals while $R_3$ and $R_4$ denote saturated or unsaturated, optionally substituted aliphatic, cycloaliphatic, araliphatic or aromatic radicals and $R_4$ moreover may be an optionally substituted alkoxy or cycloalkoxy as well as further

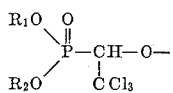

radical, wherein $R_1$ and $R_2$ have the meaning as indicated above. According to the process disclosed in the precited copending application α-hydroxy-β,β,β-trichloroethyl phosphonic acid-O,O-dialkyl esters are reacted with (thiono)-phosphonic (-phosphinic) acid halides. Phosphoric acid esters of the same type have also become known already (cf. K. V. Nikonorov, Bull., Acad., Sci., USSR 40 (1958), No. 11, 1292 to 1296).

In accordance with the present invention it has now been found that the new bis-N,N-dialkyl-amino phosphoric acid esters of the O,O-dialkyl-α-hydroxy-β,β,β-trichloroethylphosphonates of the formula as given above are obtained when O,O-dialkyl-α-hydroxy-β,β,β-trichloroethylphosphonates are reacted with bis-N,N-dialkylamino phosphoric acid chlorides preferably in the presence of inert solvents and in the presence of acid-binding agents, for instance of tertiary bases.

For the production of the claimed compounds, the corresponding phosphonates are used as starting materials and these are reacted preferably in the presence of a tertiary base and of an inert solvent at temperatures of 20 to 40° C. with bis-N,N-dialkylamino phosphoric acid chlorides. Triethylamine, anhydrous pyridine and diethylaniline have proved to be suitable tertiary bases. As solvents, hydrocarbons, such as for example benzene, toluene, xylene etc., may be considered.

The new products are colourless, water-insoluble oils which cannot be distilled without decomposition even under highly reduced pressure.

The inventive products are obtained in yields of 80 to 98% of the theoretical.

The new compounds of the present invention have excellent insecticidal properties. They very effectively kill insects like aphids, spider mites, caterpillars and particularly, flies and mosquitos. They are distinguished by an outstanding contact-insecticidal activity and also by a systemic action. Moreover they possess an activity on eating insects such as caterpillars. Most surprisingly they are of remarkably low toxicity against warmblooded animals. They may be used in the same manner as other known phosphoric insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As examples for the special utility the inventive compounds of the following formulae

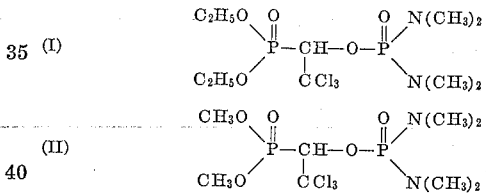

have been tested against flies and mosquitos. Aqueous dilutions of these compounds have been prepared by mixing the active ingredients with the same amounts of dimethyl formamide as an auxiliary solvent adding thereto 20% by weight referred to active ingredient of a commercial emulsifier consisting of a benzyl hydroxy polyglycol ether containing about 10 to 15 glycol ethers, and diluting this premixture at last with water to the desired concentration indicated in the following paragraphs:
The tests have been carried out as follows:

(a) Against flies: About 50 flies (*Musca domestica*) are placed under covered petri dishes in which drip wet filter papers have been placed which are sprayed with insecticidal solutions of concentrations as shown below. The living status of the flies has been determined after 24 hours. The following results have been obtained:

| Compound | Aqueous concentration (in percent active ingredient/water) | Killing rate (in percent) |
|---|---|---|
| I | 0.0001 | 100 |
| II | 0.0001 | 100 |

(b) Against mosquitos of the type *Aedes aegypti:* About 8–12 mosquitos are placed under covered petri dishes in which drip wet filter papers have been placed which have been sprayed with an insecticidal solution prepared as indicated above and in a concentration as shown below. The living status has been determined after 24 hours. The following results have been obtained:

| Compound | Aqueous concentration (in percent active ingredient/water) | Killing rate (in percent) |
|---|---|---|
| I | 0.00001 | 100 |
| II | 0.00001 | 100 |

In comparison to the comparable phosphoric acid esters of analogous constitution known from the literature cited above, the new compounds of the present invention are distinguished by their very considerably increased insecticidal action. This fact is evident from the following results of comparative tests.

| Compounds according to the invention | Administration against | Concentration of active ingredient in percent | Killing rate of pests in percent |
|---|---|---|---|
| $\begin{array}{c}C_2H_5O\quad O\qquad\qquad O\quad N(CH_3)_2\\ \diagdown\|\qquad\qquad\quad\|\diagup\\ P-CH-O-P\\ \diagup\quad\|\qquad\qquad\diagdown\\ C_2H_5O\quad CCl_3\qquad\quad N(CH_3)_2\end{array}$ | Flies<br>Mosquitoes | 0.0001<br>0.00001 | 100<br>100 |
| $\begin{array}{c}CH_3O\quad O\qquad\qquad O\quad N(CH_3)_2\\ \diagdown\|\qquad\qquad\quad\|\diagup\\ P-CH-O-P\\ \diagup\quad\|\qquad\qquad\diagdown\\ CH_3O\quad CCl_3\qquad\quad N(CH_3)_2\end{array}$ | Flies<br>Mosquitoes | 0.0001<br>0.00001 | 100<br>100 |
| Known compounds: | | | |
| $\begin{array}{c}CH_3O\quad O\qquad\qquad O\quad OC_2H_5\\ \diagdown\|\qquad\qquad\quad\|\diagup\\ P-CH-O-P\\ \diagup\quad\|\qquad\qquad\diagdown\\ CH_3O\quad CCl_3\qquad\quad OC_2H_5\end{array}$ | Flies<br>Mosquitoes | 0.1<br>0.1 | 100<br>100 |
| $\begin{array}{c}CH_3O\quad O\qquad\qquad S\quad OC_2H_5\\ \diagdown\|\qquad\qquad\quad\|\diagup\\ P-CH-O-P\\ \diagup\quad\|\qquad\qquad\diagdown\\ CH_3O\quad CCl_3\qquad\quad OC_2H_5\end{array}$ | Flies<br>Mosquitoes | 0.001<br>0.001 | 100<br>100 |

This effectiveness, increased by at least one decimal power, could not be anticipated for the inventive compounds. The products of the invention therefore, represent an enrichment of the art.

The following examples illustrate the invention as claimed.

Example 1

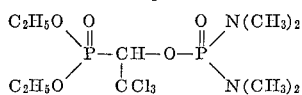

143 g. (0.5 mol) of O,O-diethyl-α-hydroxy-β,β,β-trichloroethylphosphonate are dissolved in 500 cc. of benzene. 86 g. (0.5 mol) of bis-N,N-dimethylamino phosphoric acid chloride are added to this solution whilst stirring. 51 g. of triethylamine are subsequently added dropwise to the mixture with good stirring. During the dropwise addition of triethylamine, the temperature of the mixture rises to 35° C. Stirring of the latter is continued for a further 12 hours without the supply of heat. The precipitated triethylamine hydrochloride is then filtered off with suction. The filtrate is washed with water and dried over sodium sulphate. After the solvent has been distilled off, 205 g. (98% of the theoretical yield) of the new ester of the above formula are obtained as a colourless, water-insoluble oil.

*Analysis.*—Calculated for a molecular weight of 420: N, 6.7%; P, 14.7%; Cl, 25.4%. Found: N, 6.58%; P, 14.58%; Cl, 24.5%.

The mean toxicity of the compound on rats per os amounts to 25 mg./kg. of animal weight.

Flies are completely destroyed by 0.0001% solutions, mosquitos even by 0.00001% solutions of the ester.

Example 2

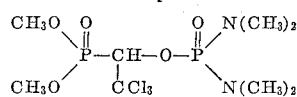

129 g. (0.5 mol) of O,O-dimethyl-α-hydroxy-β,β,β-trichloroethylphosphonate are dissolved in 500 cc. of benzene. 86 g. (0.5 mol) of bis-N,N-dimethylamine phosphoric acid chloride are added to the solution. 51 g. of triethylamine are subsequently added dropwise to the mixture, whilst stirring. The temperature of the reaction mixture rises thereby to 35° C. Stirring of the latter is continued for 12 hours at room temperature, followed by working up it as described in Example 1. 159 g. (81% of the theoretical yield) of the new ester of the above constitutions are thus obtained in the form of a colourless, water-insoluble oil.

*Analysis.*—Calculated for a molecular weight of 392: P, 15.8%; N, 7.2%; Cl, 27.2%. Found: P, 16.2%; N, 8.0%; Cl, 26.1%.

On rats per os the mean toxicity of the compound amounts to 100 mg./kg. of animal weight.

Flies are 100% destroyed by 0.0001% solutions of the ester, mosquitos are completely killed even by 0.00001% solutions.

I claim:

1. Compounds of the formula $$\begin{array}{c}R_1O\quad O\qquad\qquad O\quad N\overset{R_3}{\diagup}R_3\\ \diagdown\|\qquad\qquad\quad\|\diagup\quad\diagdown R_4\\ P-CH-O-P\\ \diagup\quad\|\qquad\qquad\diagdown\quad\diagup R_4\\ R_2O\quad CCl_3\qquad\quad N\diagdown R_4\end{array}$$

in which $R_1$ and $R_2$ stand for members selected from the group consisting of lower alkyl radicals having 1 to 4 carbon atoms and $R_3$ and $R_4$ stand for members selected from the group consisting of methyl and ethyl radicals.

2. Compounds of the formula $$\begin{array}{c}R_5O\quad O\qquad\qquad O\quad N\overset{R_3}{\diagup}R_3\\ \diagdown\|\qquad\qquad\quad\|\diagup\quad\diagdown R_4\\ P-CH-O-P\\ \diagup\quad\|\qquad\qquad\diagdown\quad\diagup R_4\\ R_6O\quad CCl_3\qquad\quad N\diagdown R_4\end{array}$$

in which $R_3$, $R_4$, $R_5$ and $R_6$ stand for members selected from the group consisting of methyl and ethyl radicals.

3. The compound of the following formula $$\begin{array}{c}CH_3O\quad O\qquad\qquad O\quad N(CH_3)_2\\ \diagdown\|\qquad\qquad\quad\|\diagup\\ P-CH-O-P\\ \diagup\quad\|\qquad\qquad\diagdown\\ CH_3O\quad CCl_3\qquad\quad N(CH_3)_2\end{array}$$

4. The compound of the following formula
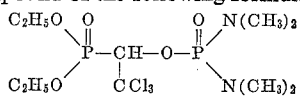
References Cited by the Examiner
UNITED STATES PATENTS
2,848,475  8/1958   Schmidt _____ 260—461
2,927,880  3/1960   Casida et al. _____ 167—22
2,995,486  8/1961   Sallmann _____ 167—22
3,064,030  11/1962  Chadwick et al. _____ 260—461
CHARLES B. PARKER, *Primary Examiner.*
JOSEPH P. BRUST, *Examiner.*
RICHARD L. RAYMOND, *Assistant Examiner.*